Jan. 2, 1923.  1,440,462
F. J. HEALEY.
VARIABLE VELOCITY RATIO GEARING.
FILED AUG. 25, 1922.  3 SHEETS-SHEET 1

Inventor
Francis Jeremiah Healey
by
his Attorney

Jan. 2, 1923.

F. J. HEALEY.
VARIABLE VELOCITY RATIO GEARING.
FILED AUG. 25, 1922.

Inventor
Francis Jeremiah Healey
by
his Attorney

Patented Jan. 2, 1923.

1,440,462

UNITED STATES PATENT OFFICE.

FRANCIS JEREMIAH HEALEY, OF LONDON, ENGLAND.

VARIABLE-VELOCITY RATIO GEARING.

Application filed August 25, 1922. Serial No. 584,225.

*To all whom it may concern:*

Be it known that I, FRANCIS JEREMIAH HEALEY, a subject of the King of Great Britain and Ireland, residing at London, England, have invented new and useful Improvements in and Relating to Variable-Velocity Ratio Gearing, of which the following is a specification.

This invention relates to variable velocity ratio gearing for the transmission of power, has particular reference to gearing involving a single chain and a pair of expansible and contractible sprockets of the type described by me in the specification of application No. 392778, filed 29th June, 1920, and has for its object the provision of means whereby reduced weight, increased simplicity of construction, reduced initial cost, and more efficient and reliable operation is obtained than was possible with the gearing described in the specification aforesaid.

The invention consists in the disposition of the guiding and expanding means being selected so that upon displacement of the blocks the teeth of the toothed segments will pass from one pitch position to approximately the next consecutive pitch position and means adapted to rotate the expanding means relative to the guiding means so as to maintain the slack in the chain constant.

Referring to the drawings, which form part of this specification,

Figure 1:
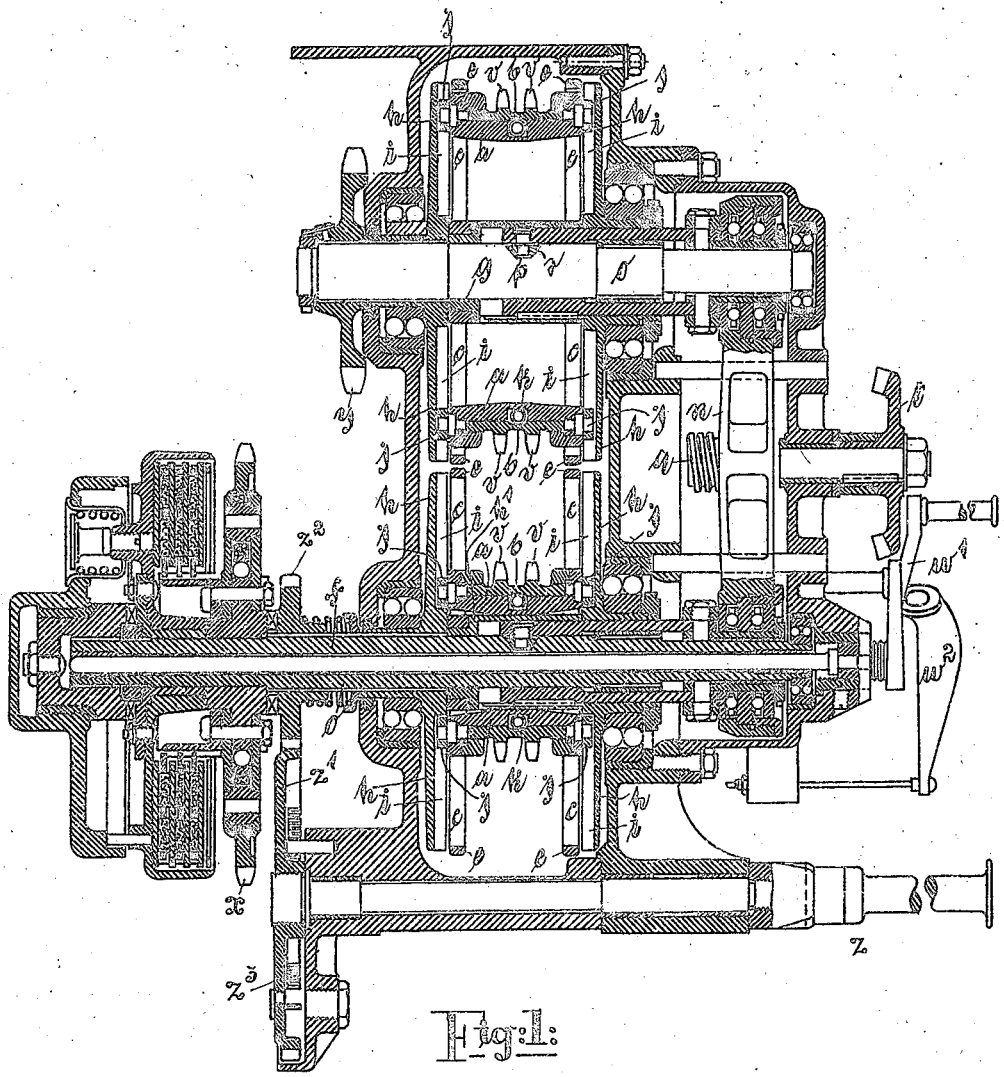
Fig. 1 is a side elevation of a gear constructed in accordance with this invention.

Referring to the drawings, the blocks $a$ carrying the toothed segments $b$ of each sprocket are engaged in and drive or are driven by slots or guides $c$ formed in two side plates $e$ keyed on to a hollow shaft $o$ mounted on the driven or driving shafts $f$, $g$, respectively as the case may be.

In addition to the side plates $e$ two plates $h$ are mounted on each shaft $f$ and $g$ said plates $h$ being provided with cam slots $i$ which engage the rollers $j$ mounted on the blocks $a$ and are adapted upon rotation of the said plates $h$ relative to the side plates $e$ to vary the effective diameter of the pitch line of the toothed segments $b$ carried by the blocks $a$. The slots or guides $c$ of the side plates $e$ and the cam slots $i$ are determined according to this invention by plotting the path of the teeth when passing from one pitch diameter to another pitch diameter.

Figures 3, 4:
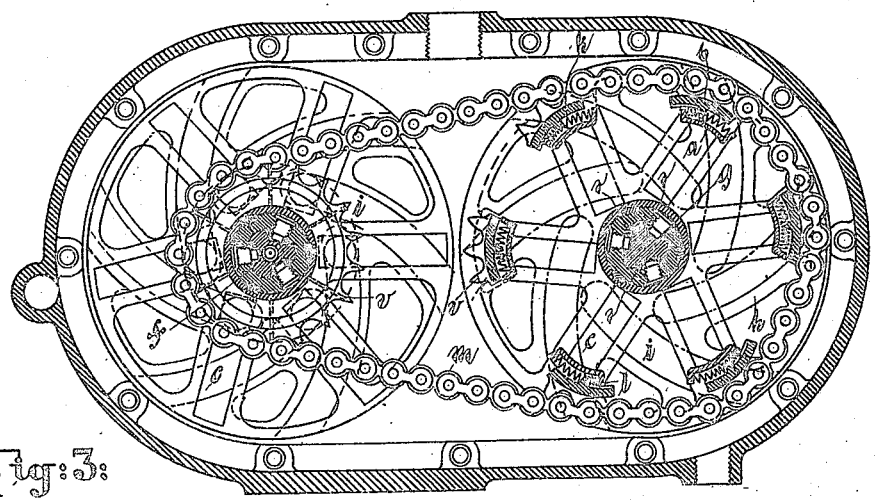
Fig. 3 is a cross sectional elevation of Fig. 1 showing the sprockets and chain.
Fig. 4 is a diagram illustrating the method by which the guiding slots and expanding cam slots are determined.

Referring to Fig. 4 the circles 1 represent the pitch diameters of sprockets including consecutive number of teeth, that is to say, the innermost circle 1 is the pitch diameter of a sprocket having 24 teeth whilst the next circle 1 is the pitch diameter of a sprocket having 25 teeth and so on, the position of the teeth being indicated by the small circles 2 located on the pitch circles 1.

The centre line of the slots $c$ and the cam slots $i$ can now be determined by choosing paths which pass through the maximum number of tooth positions. In the diagram the guide slots $c$ and the cam slots $i$ together with the rollers $j$ have been indicated and it will be seen that the slots $c$ are not radially disposed to the centre of the sprocket. By this means it is possible to enlarge or contract the effective pitch diameter of either sprocket by a single pitch length, if so desired. In some instances, it will be noticed that the locus of the rollers $j$ does not exactly pass through the required pitch positions in which case the toothed segments $b$ move slightly relative to the blocks $a$ under control of the springs $k$ but when a sprocket has been enlarged or contracted by a number of teeth equal to the number of toothed segments each segment will be in normal position and will transmit its proper share of the drive.

Further it will be seen that owing to the fact that no toothed segments can be more than half a pitch out of position a free segment such as $l$ (Fig. 3) upon meeting the chain $m$ will accommodate itself automatically and enter into proper engagement.

Each pair of plates $h$ having the cam slots $i$ therein being connected to the shafts $f$ or $g$ associated therewith rotation of one will effect rotation of the other and the two pairs of plates $h$ are mechanically connected together by means of the bar $n$ which engages with the tubular sliding shafts $o$ said shafts $o$ having a roller $r$ mounted thereon which engages with a cam slot $p$ in the central shaft the cam slots $p$ being so shaped that the slack of the chain $m$ is maintained constant. Thus it will be seen that longitudinal movement of the tubular shafts $o$ will cause rotation of the plates $h$ relative to the plates $e$. Longitudinal movement of the shafts $o$ is effected by means of the screw $q$ which engages with the bar $n$ the screw $q$ being rotated by means of the bevel wheels $s$, $t$, to the former of which is connected the operating handle $u$.

The spiral grooves $p$ may be oppositely arranged in order that upon similar longitudinal movement of the tubular shafts $o$ one sprocket is expanded whilst the other is contracted. Alternatively the cam slots $i$ may be oppositely disposed to obtain the same result.

Figure 2:
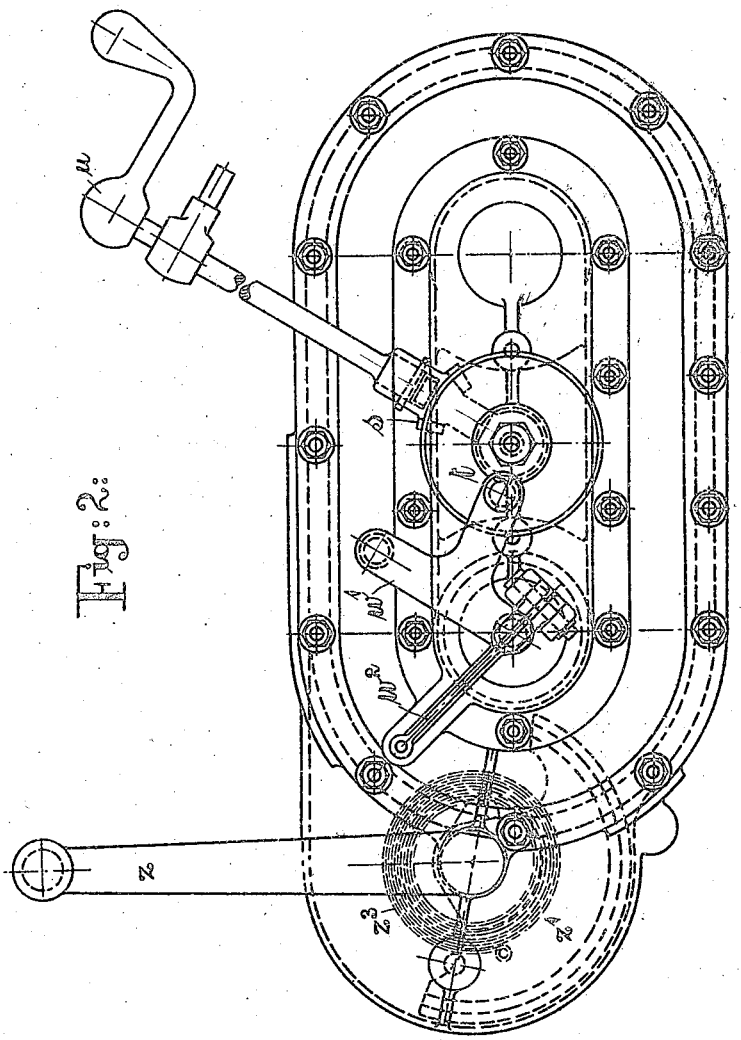
Fig. 2 is a sectional elevation of the same the chain being omitted for the sake of clearness.

In Fig. 2 of the drawings, each of the toothed segments $b$ is provided with parallelly disposed series of teeth $v$ a twin roller chain being employed in this instance, but obviously any number of chains may be employed, or alternatively, any form of chain may be employed without departing from this invention. In every case the teeth $v$ of the toothed segments $b$ will be properly selected to accurately mesh with the chain $m$ provided.

The gear box illustrated in Figs. 1, 2 and 3 of the drawings is particularly designed as a complete unit including engine starting means, the driving shaft being formed hollow to permit the actuating gear of the clutch $v$ to pass therethrough, said clutch $v$ transmitting power from the driving chain embracing the sprocket $x$ to the gear, a sprocket $y$ being provided to receive the motion transmitted by the gear box. The lever $z$, segments $z'$, gear wheel $z^2$ and spring $z^3$ comprises the engine starting mechanism, which is of well-known construction. The clutch is engaged or disengaged by means of the foot-lever $w'$ or the hand-controlled lever $w^2$ in well-known manner.

I claim:

In a variable velocity ratio gearing including expansible and contractible sprockets having blocks provided with circumferentially yieldable toothed segments adapted to engage the links of an endless chain and driving and driven shafts, the combination of nonradial guiding means for the blocks carried by the said shafts, said means being adapted to confine the movement of the blocks through paths the axes of which are tangents to circles having their centers coinciding respectively with the axes of the said shafts, means adapted to advance the blocks along their paths, and means adapted to rotate the last named means relatively to the guiding means whereby slack in the chain may be maintained constant, substantially as described.

In testimony whereof I have signed my name to this specification in the presence of two subscribing witnesses:

FRANCIS JEREMIAH HEALEY.

Witnesses:
CHARLES J. R. BULLOUGH,
OLIVE WEST.